United States Patent
Asai et al.

(10) Patent No.: US 7,457,004 B2
(45) Date of Patent: Nov. 25, 2008

(54) HALFTONE DOT FORMATION METHOD, HALFTONE DOT FORMATION APPARATUS, THRESHOLD MATRIX GENERATION METHOD USED THEREFOR AND HALFTONE DOT RECORDING MEDIUM

(75) Inventors: Hiroshi Asai, Kyoto (JP); Yasuhiro Takemoto, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 820 days.

(21) Appl. No.: 10/973,446

(22) Filed: Oct. 27, 2004

(65) Prior Publication Data

US 2005/0094212 A1 May 5, 2005

(30) Foreign Application Priority Data

Oct. 29, 2003 (JP) .......................... P2003-369136

(51) Int. Cl.
*H04N 1/405* (2006.01)
*H04N 1/409* (2006.01)

(52) U.S. Cl. ..................................... 358/3.06; 358/3.13

(58) Field of Classification Search ................ 358/3.06, 358/3.09, 3.1, 3.11, 3.12, 3.13, 3.16, 3.17, 358/3.19, 3.2, 534, 535, 536

See application file for complete search history.

(56) References Cited

U.S. PATENT DOCUMENTS

| | | | |
|---|---|---|---|
| 4,916,545 A * | 4/1990 | Granger | 358/3.26 |
| 5,182,990 A | 2/1993 | Kline et al. | |
| 5,766,807 A | 6/1998 | Delabastita et al. | |
| 6,975,431 B1 * | 12/2005 | Sugizaki | 358/3.06 |
| 7,265,875 B2 * | 9/2007 | Kress | 358/3.06 |
| 2002/0051147 A1 * | 5/2002 | Asai | 358/1.9 |

FOREIGN PATENT DOCUMENTS

| | | |
|---|---|---|
| JP | 2736048 | 1/1998 |
| JP | 10-145593 | 5/1998 |
| JP | 11-177821 | 7/1999 |
| JP | 3427026 | 5/2003 |

OTHER PUBLICATIONS

Schreiber "Fundamentals of Electronic Imaging Systems" Springer-Verlag New York, May 1, 1993, pp. 168-170.

IRI, "Separate Volume of 'Bit'", Computational Geometry and Geographic Information Technology, Kyoritsu Shuppan Co., Ltd. Sep. 10, 1986, pp. 163 to 168.

* cited by examiner

*Primary Examiner*—Thomas D Lee
(74) *Attorney, Agent, or Firm*—McDermott Will & Emery LLP

(57) ABSTRACT

Halftone cells each serving as a unit for formation of a dot are arranged in irregular shapes at random and divided into two groups. The halftone cells (720) in the first group are fewer than the halftone cells (730) in the second group and dispersed, and the area of each of the halftone cells (720) in the first group is set larger than that in the second group. The dot growth speed of the halftone cells (720) in the first group is higher than that of the halftone cells (730) in the second group. This allows formation of fine halftone dots consisting of the halftone cells in the first and second groups, and it is possible to reduce banding appearing in a main scan direction during recording of the halftone dots, with low-frequency components in spatial frequency of the halftone dots caused by the halftone cells (720) in the first group.

15 Claims, 15 Drawing Sheets

F/G. 16B
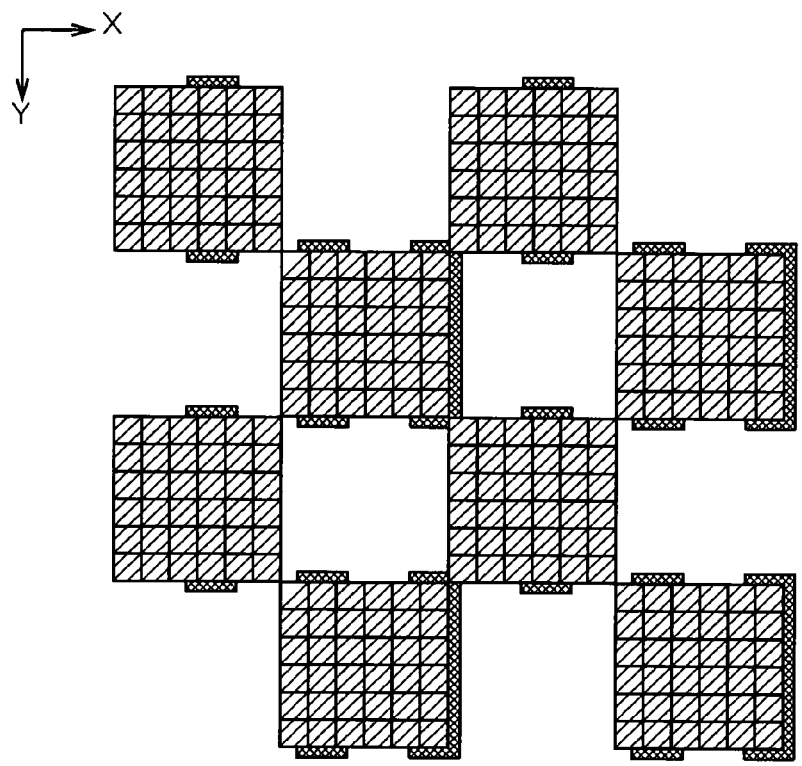
F/G. 16C
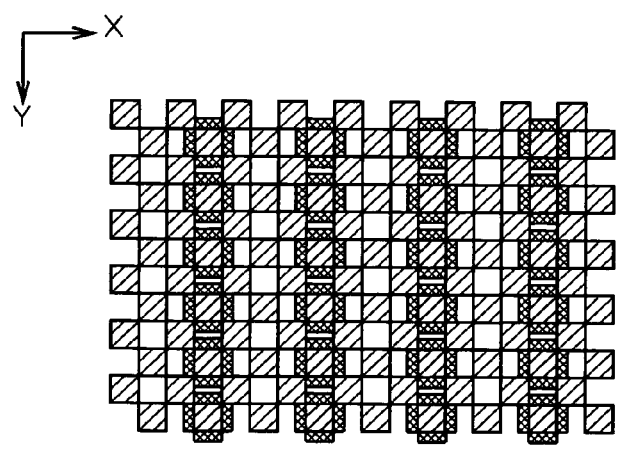

F I G. 22B
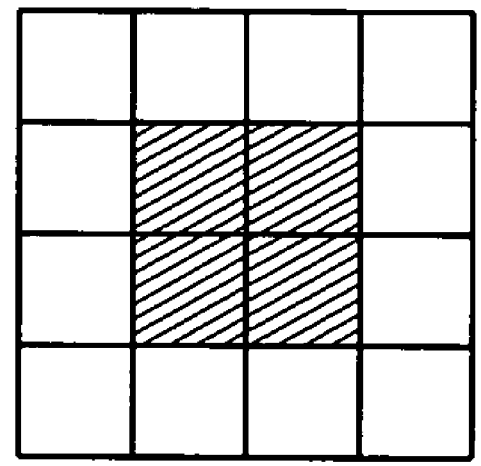

HALFTONE DOT FORMATION METHOD, HALFTONE DOT FORMATION APPARATUS, THRESHOLD MATRIX GENERATION METHOD USED THEREFOR AND HALFTONE DOT RECORDING MEDIUM

BACKGROUND OF THE INVENTION

1. Field of the Invention

The present invention relates to a technique for forming halftone dots used to represent an original image of gray scale.

2. Description of the Background Art

In many cases where printing data or printing plate data are made from grayscale images, creation of halftone dots, as one of halftoning method, is used. Among well-known types of dot shape are square, chain, elliptical one, round one or the like. Halftone dots to make gradation with the number of dots unchanged and the size of dots changed are referred to as "AM halftone dots".

The AM halftone dot, however, has the following problems of: a) causing moire when an image having a periodic pattern is represented by halftone dots, b) causing a rosette pattern (moire pattern) in multicolor printing, c) having difficulty in avoiding moire when four or more colors are superposed in printing and so being not suitable for high quality color printing, and so on. The above problems a) and b) can be solved by increasing screen ruling serving as reference for writing of halftone dots (in other words, by fining the halftone dots), but in this case, there arises new problems of: d) degrading reproduction in printing of minimum writing dots in a highlight area and a shadow area, and e) making banding noticeable (noticeable lines in a scan direction caused by an influence of an output equipment, not due to halftone dot structure, e.g., caused by non-uniformity in dot size in multichannel writing or incomplete arrangement of swath (band written in a main scan) with respect to a subscan direction.

The problem d) can be solved by increasing the minimum dot size by using threshold matrix shown in FIG. 6.24 of pp. 168 to 170 of "Fundamentals of Electronic Imaging Systems" by F. W. Schreiber, U.S.A. the third edition, Springer-Verlag New York, May 1, 1993, or by using methods disclosed in Japanese Patent Application Laid Open Gazette No. 10-145593 or patent Publication No. 2736048 to leave relatively large dots in the highlight area and the shadow area.

On the other hand, for creating halftone dots, a method termed "FM screening" where gradation is made by changing the number of dots of fixed size which are appropriately arranged (at random but not at extremely high or low density) is used in some cases. The FM screening is effective for the above problems a) to c). patent Publication No. 3427026 discloses a method of connecting dots at random and Japanese Patent Application Laid Open Gazette No. 11-177821 discloses a method of decreasing the number of dots in the highlight area. These methods are effective for the above problems a) to d) to be solved. In patent Publication No. 3427026 and Japanese Patent Application Laid Open Gazette No. 1 1-177821, the centers of dots are arranged at random and the shapes of the halftone cells each serving as a unit for formation of a halftone dot are obtained by e.g., using a Voronoi diagram (see "separate volume of "bit", Computational Geometry and Geographic Information Technology", supervised by Masao Iri, published by Kyoritsu Shuppan Co., Ltd., Sep. 10, 1986, pp. 163 to 168).

For the above problem e), since banding becomes noticeable when superposition is made in printing, it is possible to reduce banding (noticeable lines) in multicolor printing by using different channels for color components to perform writing to one portion in multichannel writing shown in U.S. Pat. No. 5,182,990.

The halftone dots created by FM screening, which are fine in structure, are likely cause the banding (the above problem e) as compared with the AM halftone dots and the AM halftone dots make banding noticeable when they are fine. There is actually no effective measure to solve the problem of banding. The methods of Patent Publication No. 3427026 and Japanese Patent Application Laid Open Gazette No. 11-177821 are effective for a beat pattern which appears in a specific direction irrelevant to the scan direction, by interference between the halftone structure and the number of channels for printing or writing but have room for improvement in solution of banding which is caused in the scan direction, being independent of the halftone structure.

The method of U.S. Pat. No. 5,182,990 is effective for multicolor printing but not a radical solution for banding since it has no measure to solve banding for each color component.

SUMMARY OF THE INVENTION

The present invention is intended for a halftone dot formation method for forming halftone dots used to represent an original image of gray scale, and it is an object of the present invention to refine the halftone dots in monochrome (halftone dots for each color component in a color image) while reducing banding.

The halftone dot formation method of the present invention comprises the steps of arranging a plurality of halftone cells in irregular shapes at random and dividing the plurality of halftone cells into a plurality of groups each consisting of halftone cells which are distributed almost uniformly, and forming halftone dots on the basis of an original image with the plurality of groups having different dot growth speeds each of which corresponds to the amount of variation of a dot area in a halftone cell with respect to the amount of variation in gray level of the original image.

In the present invention, by arranging the halftone cells of different sizes uniformly at random, it becomes possible to reduce banding in fine halftone dots for monochrome.

In the halftone dot formation method of the present invention, the halftone cells may be divided into a plurality of highlight-side halftone cells each having a dot area which varies in accordance with variation in highlight-side gray level and a plurality of shadow-side halftone cells each having a dot area which varies in accordance with variation in shadow-side gray level. In this case, the halftone dot formation method comprises the steps of arranging a plurality of halftone cells in irregular shapes at random and dividing the plurality of highlight-side halftone cells into a plurality of groups each consisting of halftone cells which are distributed almost uniformly and the plurality of shadow-side halftone cells into a plurality of groups each consisting of halftone cells which are distributed almost uniformly, and forming halftone dots on the basis of an original image with the plurality of groups having different dot growth speeds each of which corresponds to the amount of variation of a dot area in a halftone cell with respect to the amount of variation in gray level of the original image both in the plurality of highlight-side halftone cells and the plurality of shadow-side halftone cells.

It thereby becomes possible to almost symmetrize variation characteristics of halftone dots in response to variation in gray level of the original image in the highlight side and the shadow side.

The present invention is also intended for a halftone dot formation apparatus for forming halftone dots used to represent an original image of gray scale, still also for a method of generating a threshold matrix which is compared with the original image in forming the halftone dots in the halftone dot formation method or by the halftone dot formation apparatus, and further intended for a halftone dot recording medium in which the halftone dots are recorded.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 16B and 16C are views showing examples of halftone dots which are written;

FIG. 22A is a view showing a minimum dot and FIGS. 22B is a view illustrating a preferable minimum dot.

DESCRIPTION OF THE PREFERRED EMBODIMENTS

Figure 1:
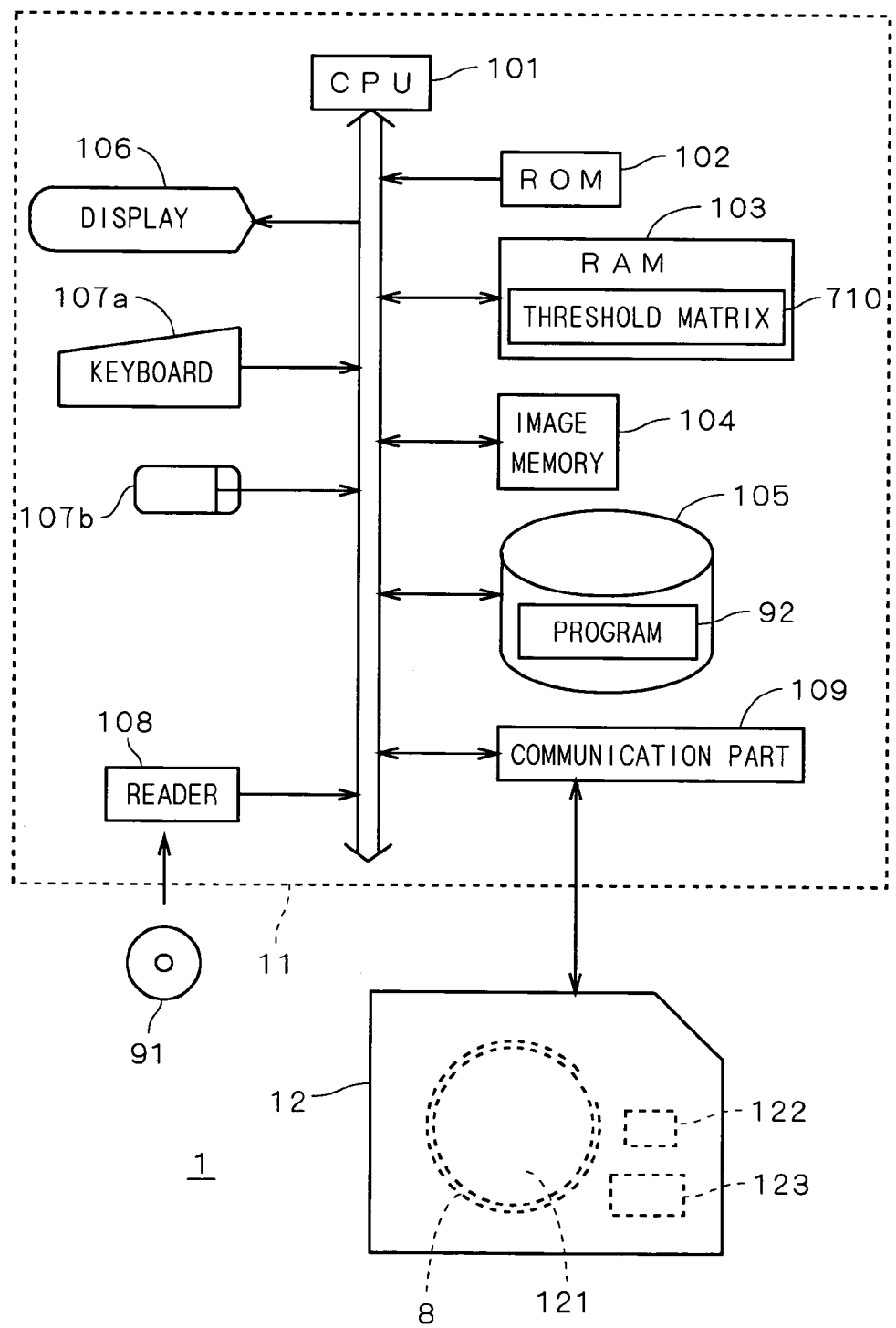
FIG. 1 is a view showing a structure of an image recording system.

FIG. 1 is a view showing a structure of an image recording system 1 in accordance with one preferred embodiment of the present invention. The image recording system 1 comprises a computer 11 and an image recording apparatus 12, and the image recording apparatus 12 receives a signal from the computer 11 and records halftone dots on a printing plate serving as a halftone dot recording medium by using light beams from a multichannel laser or the like. The image recording apparatus 12 may be an electrophotographic or ink-jet printing apparatus using a photosensitive drum or printing paper as the halftone dot recording medium.

The computer 11 has a constitution of general computer system where a CPU 101 for performing various computations, a ROM 102 for storing a basic program and a RAM 103 for storing various information are connected to a bus line. To the bus line, an image memory 104 for storing data of a grayscale image (hereinafter, referred to as "original image") to be represented by halftone dots, a fixed disk 105 for storing information, a display 106 for displaying various information, a keyboard 107a and a mouse 107b for receiving an input from an operator, a reader 108 for reading information from a computer-readable recording medium 91 such as an optical disk, a magnetic disk or a magneto-optic disk, and a communication part 109 for making communication with the image recording apparatus 12 are further connected through an interface (I/F) as appropriate.

The image recording apparatus 12 comprises a drum 121 holding a printing plate 8 on its side surface, a writing head 122 for outputting light beams which are modulated in multichannel towards the printing plate 8, a signal generation circuit 123 for generating a signal of halftone dot image to be transmitted to the writing head 122, a driving mechanism for scanning the writing head 122 with respect to the printing plate 8 by rotating the drum 121 and moving the writing head 122 along a rotation axis of the drum 121, and the like. In the following discussion, "pixel" refers to one unit for recording (writing) in the image recording apparatus 12 and corresponds to one spot by one light beam.

In the computer 11, a program 92 is read out from the recording medium 91 through the reader 108 in advance and stored in the fixed disk 105. Then, the program 92 is copied in the RAM 103 and the CPU 101 performs a computation according to the program 92 in the RAM 103 (that is, the computer 11 executes the program), by which the computer 11 generates a threshold matrix (also referred to as "SPM (Screen Pattern Memory) data) 710 to be used for formation of halftone dots, which is discussed later. The threshold matrix 710 and the data of the original image of gray scale stored in the image memory 104 are transmitted to the image recording apparatus 12 through the communication part 109, the signal generation circuit 123 in the image recording apparatus 12 generates signals of halftone dots used to represent the original image and the halftone dots are recorded on the printing plate 8 on the basis of the halftone signals while the writing head 122 is scanned with respect to the printing plate 8.

Recording the halftone dots on the printing plate 8 may be regarded as a (physical) formation of the halftone dots, and generation of the signals for the halftone dot image may be regarded as a (nonphysical) formation of the halftone dots. The generation of the signals for the halftone dot image may be performed by the computer 11 by software and in this case, the computer 11 solely forms the halftone dots on the basis of the original image.

Figure 2:
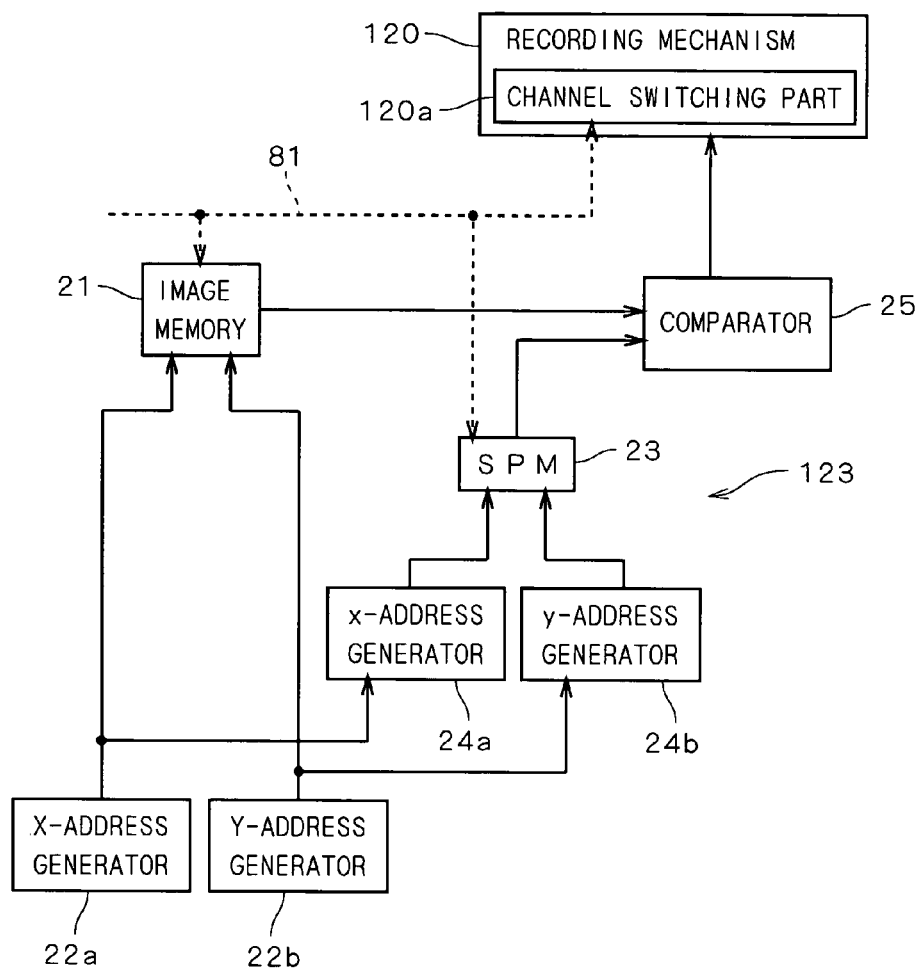
FIG. 2 is a block diagram showing a signal generation circuit and a recording mechanism.

FIG. 2 is a block diagram showing constituent elements of the signal generation circuit 123 in the image recording apparatus 12 and a recording mechanism 120. The recording mechanism 120 corresponds to the drum 121, the writing head 122, a mechanism for driving these elements, a circuit for controlling these elements or the like.

The signal generation circuit 123 comprises an image memory 21 for storing data of original image of gray scale, an X-address generator 22a and a Y-address generator 22b for generating a subscan address (X address) and a main scan address (Y address) of the original image, respectively, an SPM (Screen Pattern Memory) 23 for storing the threshold matrix 710 generated by the computer 11, an x-address generator 24a and a y-address generator 24b for generating a subscan address (x address) and a main scan address (y address) of the threshold matrix 710, respectively, and a comparator 25.

Figure 3:
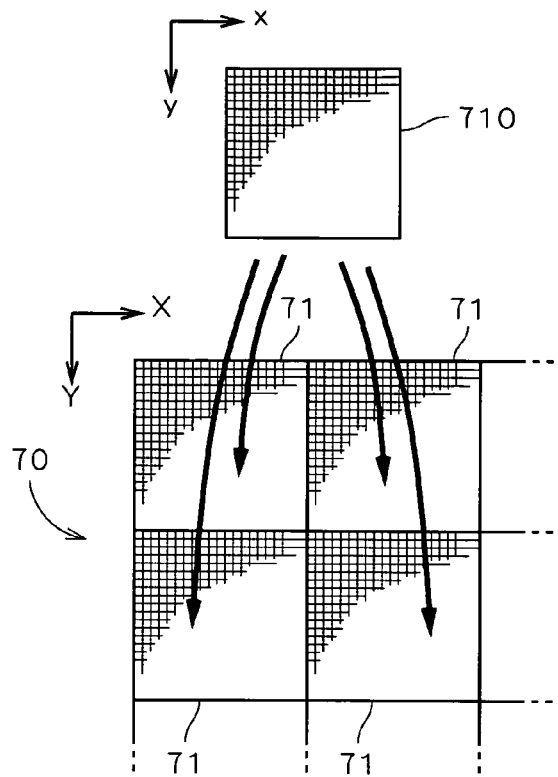
FIG. 3 is a view showing a repeat area and a threshold matrix.

In creating halftone dots of the original image, as shown in FIG. 3, the original image 70 is divided into a lot of areas having the same size to set repeat areas 71 each serving as a unit for creation of halftone dots. The SPM 23 has a matrix area which is a storage area that corresponds to one repeat area 71, and sets a threshold value for each address (coordinates) of the matrix area to store the threshold matrix 710. Then, conceptually, the repeat area 71 of the original image 70 and the threshold matrix 710 are superposed and the gray level of each pixel in the repeat area 71 is compared with a corresponding threshold value in the threshold matrix 710, to thereby determine whether writing should be performed on the position of the pixel on the halftone dot recording medium or not. Therefore, if the gray level of the original image 70 is uniform, writing is performed on a pixel having an address where a threshold value smaller than the gray level is set in the threshold matrix 710 and macroscopically, uniform halftone dots are generated. Actually, since the original image 70 has gradation (i.e., portions having various gray levels), the halftone dots vary in the repeat area 71 in accordance with the gradation in the original image 70.

Specific discussion will be made on creation of halftone dots, referring to FIG. 2. The gray level of one pixel in the original image 70 is read out from the image memory 21 on the basis of an X address and a Y address from the X-address generator 22a and the Y-address generator 22b, respectively. On the other hand, an x address and a y address in the repeat area corresponding to the X address and the Y address in the original image are obtained by the x-address generator 24a and the y-address generator 24b, respectively, and one threshold value in the threshold matrix 710 is thereby specified and read out from the SPM 23. The comparator 25 compares the gray level from the image memory 21 with the threshold value from the SPM 23, and when the gray level is larger than the threshold value, a signal to indicate that writing should be performed on the position of the pixel is generated.

When the original image is a color image, a color component specifying signal 81 is inputted to the image memory 21, the SPM 23 and a channel switching part 120a in the recording mechanism 120 and an operation of the image recording apparatus 12 in this case will be discussed later.

Figure 4:
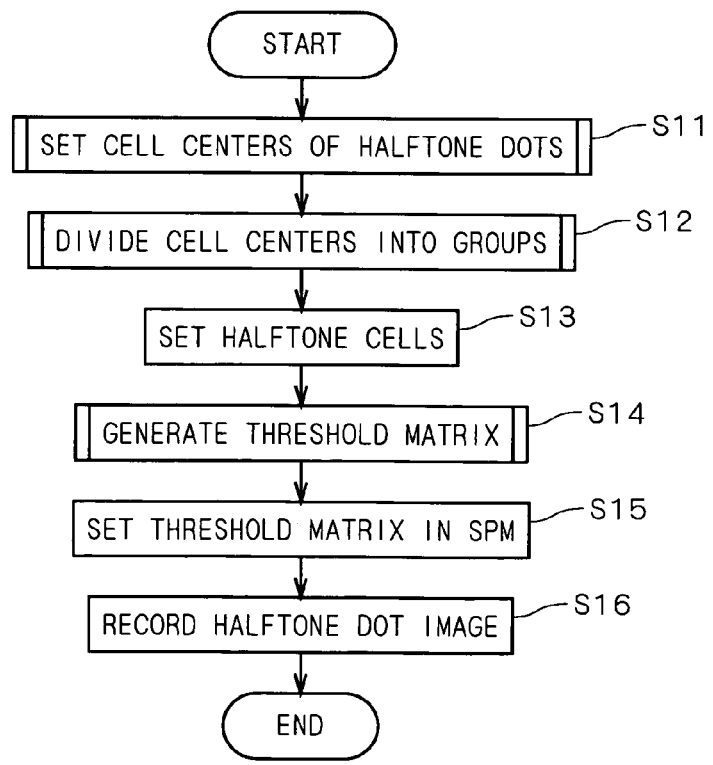
FIG. 4 is a flowchart showing an operation flow of the image recording system.
Figure 5:
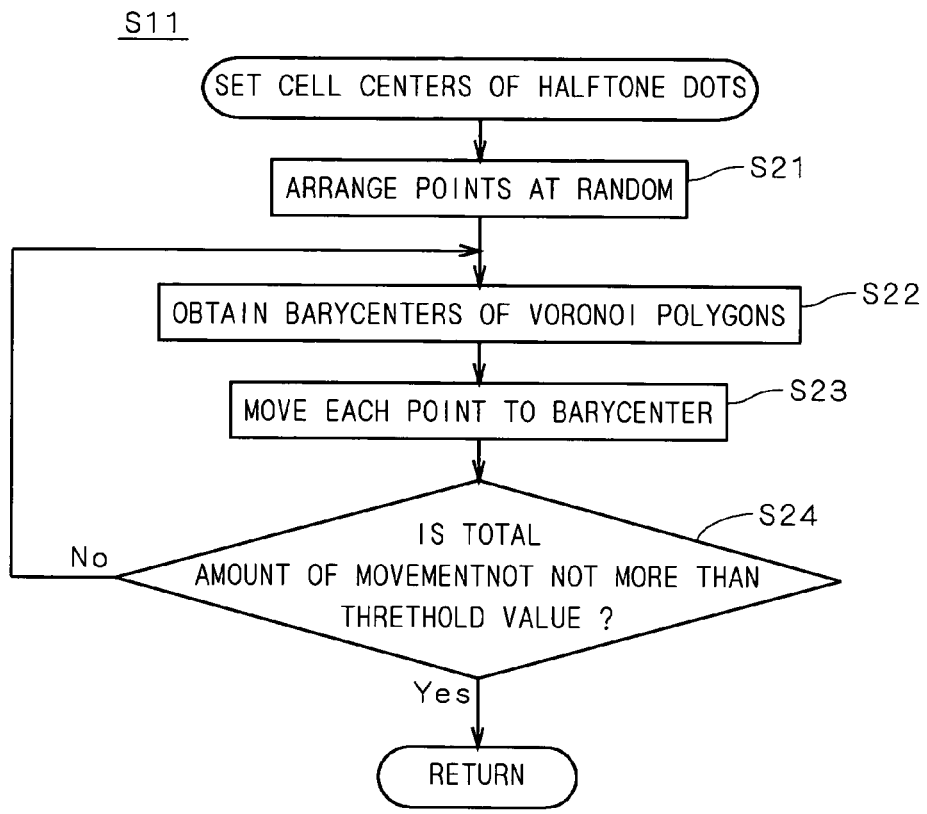
FIG. 5 is a flowchart showing an operation of setting cell centers.

FIG. 4 is a flowchart showing an operation flow of the image recording system 1. In recording the halftone dots on the printing plate 8 by the image recording system 1, first, the computer 11 sets centers of halftone cells (hereinafter, referred to as "cell centers") each serving as a unit of an area where the halftone dots is formed (Step S11). The halftone cells having irregular shapes are arranged at random with no clearance (see FIG. 10), and this prevents any moire or beat pattern in the halftone dots which are finally formed. FIG. 5 is a flowchart showing an operation of setting cell centers in detail, and FIGS. 6A to 6C are views showing steps of setting the cell centers.

In setting of the cell centers, for example, a solution of facility location problem using Voronoi diagrams can be used. The facility location problem is a nonlinear optimization problem for determining location of a plurality of facilities in a two-dimensional space so that the total of expenditures to be used by a lot of users present in the two-dimensional space to utilize the facilities should become a minimum value. In this case, the evaluation function used to obtain the "expenditures" is, e.g., a distance between a user and each facility. The Voronoi diagram is described in detail in "separate volume of "bit", Computational Geometry and Geographic Information Technology", supervised by Masao Iri, published by Kyoritsu Shuppan Co., Ltd., Sep. 10, 1986, pp. 163 to 168).

Figure 6A:
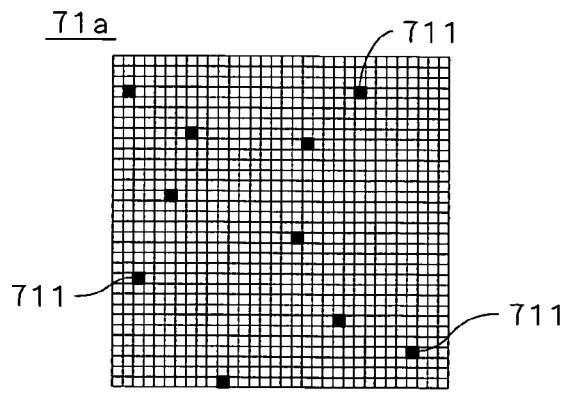
FIGS. 6A to 6C are views showing steps of setting the cell centers.
Figure 6B:
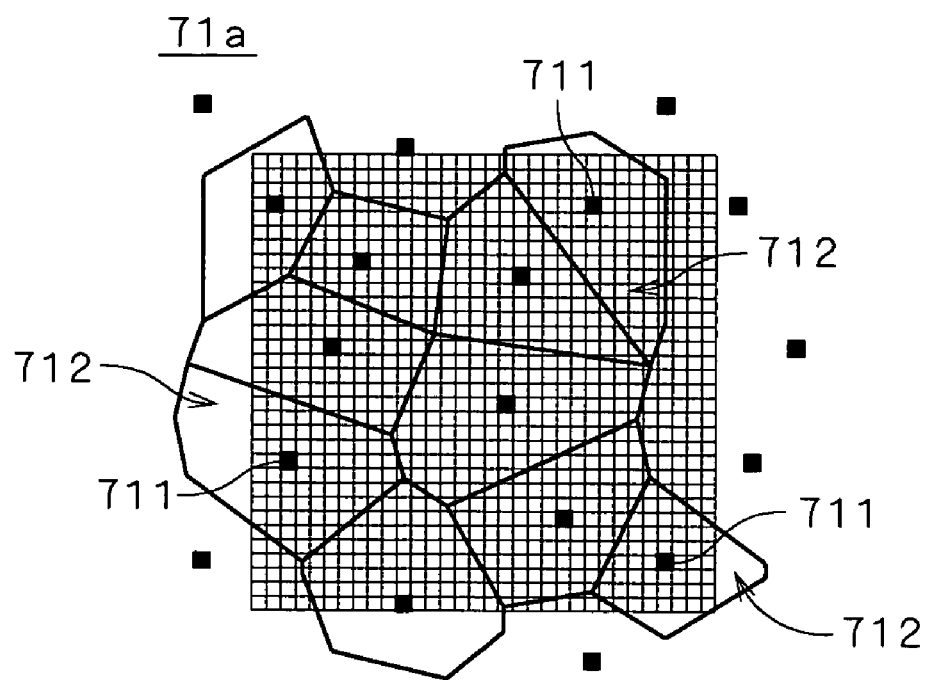
Figure 6C:
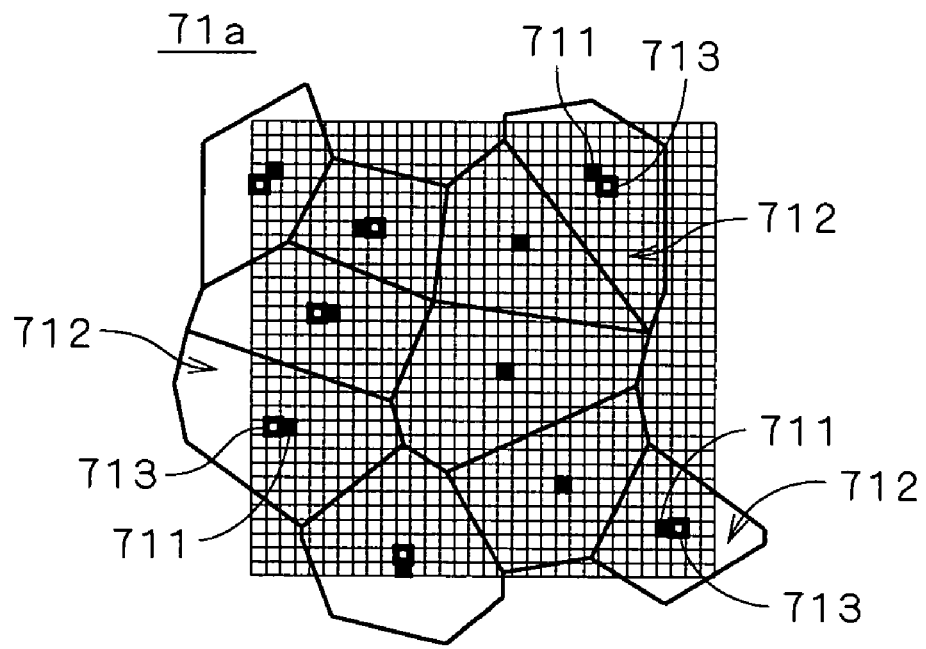

In setting of the cell centers shown in FIG. 5, first, points 711 (a point serving as a reference for forming a Voronoi polygon) as many as the halftone cells are set at random in an area 71a (a virtual area for generating the threshold matrix 710) which corresponds to the repeat area 71, as illustrated in FIG. 6A (Step S21). In actual cases, the number of pixels in the area 71a and the number of points are each larger than the number shown in FIG. 6A. Next, Voronoi diagrams around the points are obtained. Specifically, perpendicular bisectors of line segments connecting any one point and its neighboring points are obtained, and by connecting intersection points of the perpendicular bisectors, a Voronoi polygon 712 is formed as shown in FIG. 6B. Then, as shown in FIG. 6C, a barycenter 713 of each Voronoi polygon 712 is obtained (Step S22). In FIG. 6C, the barycenters 713 of the Voronoi polygons 712 are represented by blank squares. In the Voronoi polygons 712 in which the barycenters 713 are not clearly shown, the barycenters 713 coincide with the original points 711.

Each point 711 is moved to the position of the barycenter 713 (Step S23), and whether the total amount of movement is not more than a predetermined threshold value or not is checked (Step S24). When the total amount of movement is more than the threshold value, the proceeding goes back to Step S22 and formation of the Voronoi polygons 712, calculation of the barycenters 713 and movement of the points 711 are repeated. When the total movement of the points 711 becomes not more than the threshold value, the points 711 are distributed in the area 71a irregularly but uniformly and the positions of the points 711 are determined as the cell centers. By distributing the cell centers almost uniformly, the tint of the generated halftone dots becomes smooth. For setting of the cell centers, methods other than the above may be used only if the cell centers are arranged almost uniformly at random.

When setting of the cell centers is completed, subsequently, these cell centers are divided into a first group and a second group (FIG. 4: Step S12). The cell centers in the first group are selected so that its number should be sufficiently smaller than the number of cell centers in the second group and should be distributed with good balance in the area 71a. With this, the cell centers in the first group do not become adjacent to one another. Grouping of the cell centers substantially corresponds to grouping of the halftone cells set in the later step, and by grouping the cell centers as above, the halftone cells are divided into two groups each consisting of halftone cells which are distributed almost uniformly and the halftone cells having the cell centers in the first group are not adjacent to one another.

Figure 7:
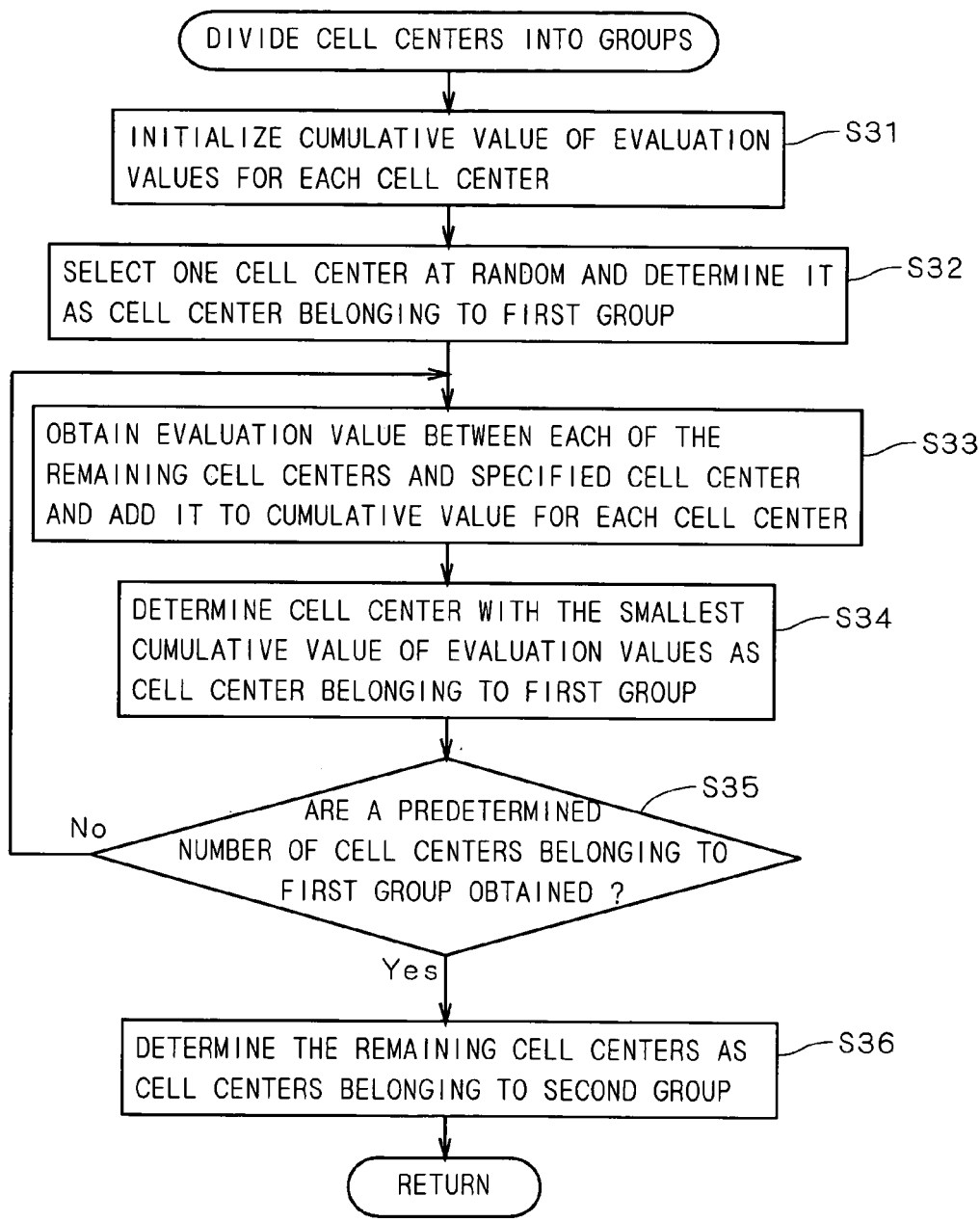
FIG. 7 is a flowchart showing an operation of grouping the cell centers.

FIG. 7 is a flowchart showing a specific operation of grouping the cell centers. In the following discussion, it is assumed that the total number of cell centers is m and the number of cell centers selected to belong to the first group is n. In the grouping operation, first, a variable for storing a cumulative value of evaluation values discussed later is assigned to each cell center, and this variable is initialized to 0 (Step S31). Then, one cell center is selected randomly out of m cell centers and this cell center (hereinafter, referred to as "specified cell center") is determined as the cell center belonging to the first group (Step S32).

Next, for each of the remaining (m−1) cell centers, an evaluation value is obtained, which becomes smaller as the distance between the cell center and the specified cell center is longer. For example, when the specified cell center has coordinates of (x0, y0) in the area 71a and the cell center whose evaluation value is directed to be calculated has coordinates (x, y), the evaluation value f1 (x, y) is obtained by computation of Eq. 1 as the reciprocal of the square of the distance between these two cell centers.

$$f1(x, y) = \frac{1}{(x-x0)^2 + (y-y0)^2} \quad \text{(Eq. 1)}$$

Figure 8:
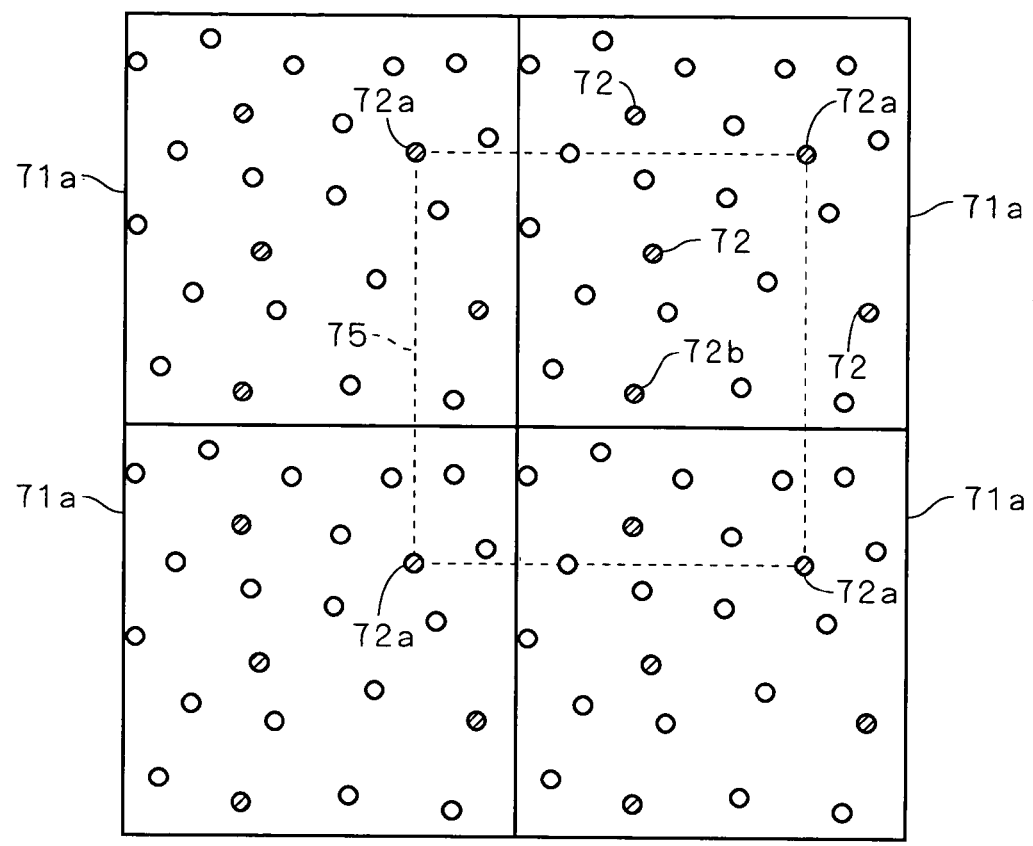
FIG. 8 is a view showing a manner of grouping the cell centers.

Since the repeat area 71 is actually repeated vertically and horizontally, both the specified cell center and the cell center whose evaluation value is directed to be calculated appear repeatedly in vertical and horizontal directions. Then, calculation of the evaluation value is executed in consideration of a vertical and horizontal repeat of the area 71a in which the cell centers are set. Specifically, as shown in FIG. 8, four areas 71a each having an arrangement of the cell centers set in Step S11 are arranged in a matrix with two rows and two columns, and an area 75 obtained by connecting four specified cell centers 72a is determined. After that, the cell centers whose evaluation values are to be calculated are sequentially selected in the area 75 and the evaluation value is calculated between the selected cell center and the farthest one of the four specified cell centers 72a therefrom.

When calculation of the evaluation value is finished, the evaluation value is added to the variable assigned to the cell center (Step S33). Immediately after calculation of the first evaluation value, the evaluation value itself is stored in the variable. Then, the cell center having the smallest evaluation value is determined as the second cell center belonging to the first group (Step S34). In the case of FIG. 8, a cell center 72b positioned at almost center of the area 75 (in other words, the cell center farthest away from any one of the four specified cell centers 72a) is determined as a cell center belonging to the first group.

When two cell centers belonging to the first group are set, next, the last one of the cell centers belonging to the first group is determined as the specified cell center, and then the proceeding goes back to Step S33 and the evaluation value is calculated between each of the remaining (m-2) cell centers and the specified cell center. The calculated evaluation value is added to the variable assigned to the cell center, and the variable of the cell center stores the sum of the evaluation value for the first specified cell center and the evaluation value for the second specified cell center (i.e., the cumulative value of the evaluation values). Then, one of the cell centers having the smallest cumulative value of its evaluation value is determined as the third cell center belonging to the first group and also as the specified cell center, and the proceeding goes back to Step S33.

After that, Steps S33 and S34 are further repeated (Step S35), and one of the cell centers having the smallest sum (cumulative value discussed above) of the evaluation values between this cell center and the cell centers which have been already set in the first group, and in other words, the cell center which is moderately far away from any one of the cell centers set in the first group is sequentially determined as a cell center 72 belonging to the first group as illustrated in FIG. 8. This avoids unbalanced location of the cell centers belonging to the first group and allows the cell centers to be appropriately dispersed. When the number of cell centers belonging to the first group reaches n, the repeat operation is finished, and the remaining (m-n) cell centers are set in the second group (Step S36). The cell centers belonging to the first group are given cell numbers ranging from 0 to (n−1) and the cell centers belonging to the second group are given cell numbers ranging from n to (m−1).

Figure 9:
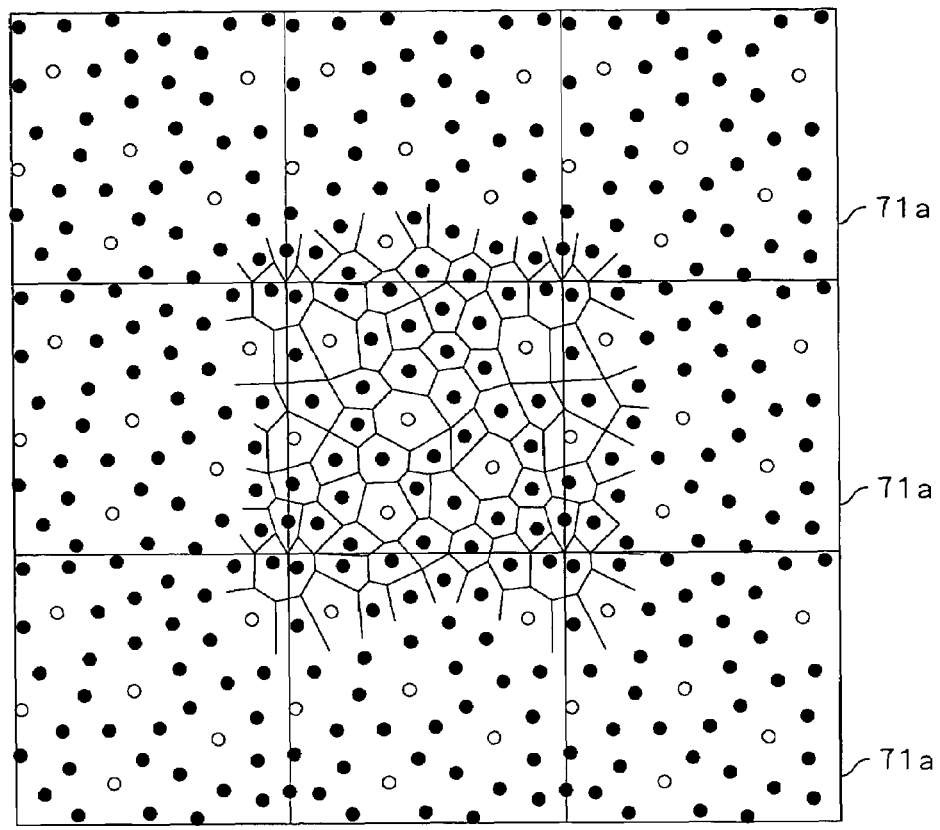
FIG. 9 is a view illustrating an area where halftone cells are set.
Figure 10:
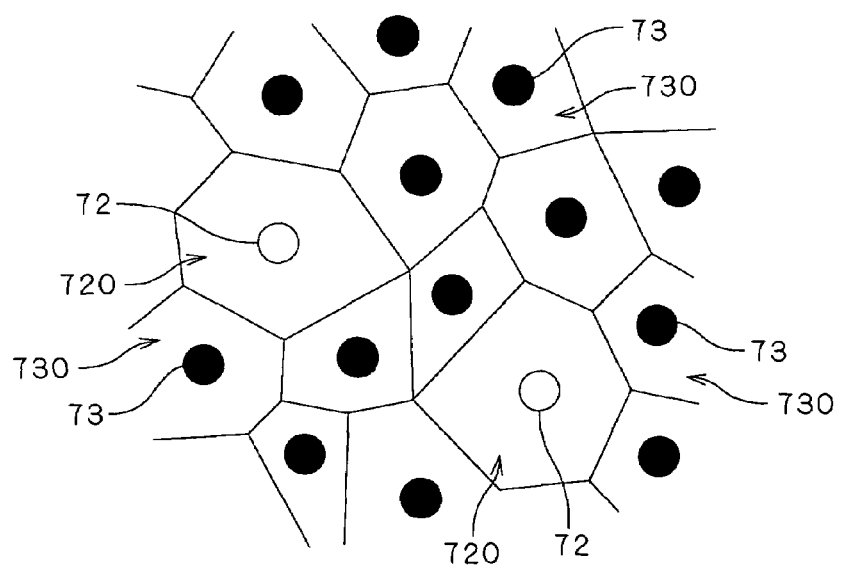
FIG. 10 is an enlarged view showing some of the halftone cells.

When grouping of the cell centers is completed, a halftone cell with each cell center as its center is set (FIG. 4: Step S13). FIG. 9 is a view illustrating the area 71a where halftone cells of polygon are set, and also showing vertical and horizontal repeat of the area 71a. FIG. 10 is an enlarged view showing some of the halftone cells. In FIGS. 9 and 10, blank circles represent the cell centers in the first group and solid circles represent the cell centers in the second group. As shown in FIG. 10, in setting of the halftone cells, an area of a halftone cell 720 having the cell center 72 of the first group as its center (hereinafter, referred to as "halftone cell in the first group") is made larger than that of a halftone cell 730 having a cell center 73 of the second group as its center (hereinafter, referred to as "halftone cell in the second group").

Such a setting of halftone cells is executed, for example, as follows. First, in order to determine which cell center a pixel having coordinates (x, y) belongs to, computation of Eq. 2 is performed on the cell center with cell number i which is positioned at coordinates (xi, yi) to obtain an evaluation value f2 (xi, yi). In consideration of the vertical and horizontal repeat of the area 71a, like the grouping of the cell centers, the computation of Eq. 2 is executed on one of the cell centers with cell number i which is closest to the coordinates (x, y). Then, it is determined that the halftone cell having the cell center whose evaluation value f2 is smallest should include this pixel.

$$f2(xi, yi) = [(x-xi)^2 + (y-yi)^2] \cdot \alpha \quad \text{(Eq. 2)}$$

The coefficient α in Eq. 2 is a value smaller than 1 when (i<n), in other words, the cell center belongs to the first group and is 1 when (i≧n), in other words, the cell center belongs to the second group. By determining a halftone cell to which each pixel in the area 71a belongs, the halftone cells illustrated in FIGS. 9 and 10 are finally set. By the function of the coefficient α, an average area of the halftone cells in the first group is larger than that of the halftone cells in the second group.

Exactly, since the area of the halftone cell is affected by the density of the cell centers, though each of the areas of all the halftone cells in the first group is not necessarily larger than the area of any one of the halftone cells in the second group, it is preferable that each of the areas of all the halftone cells in the first group should be larger than the area of any one of the halftone cells in the second group by making an effect of the difference of the coefficient a on the area of the halftone cell larger than the effect of variation in density of the cell centers in the area 71a.

Figure 11:
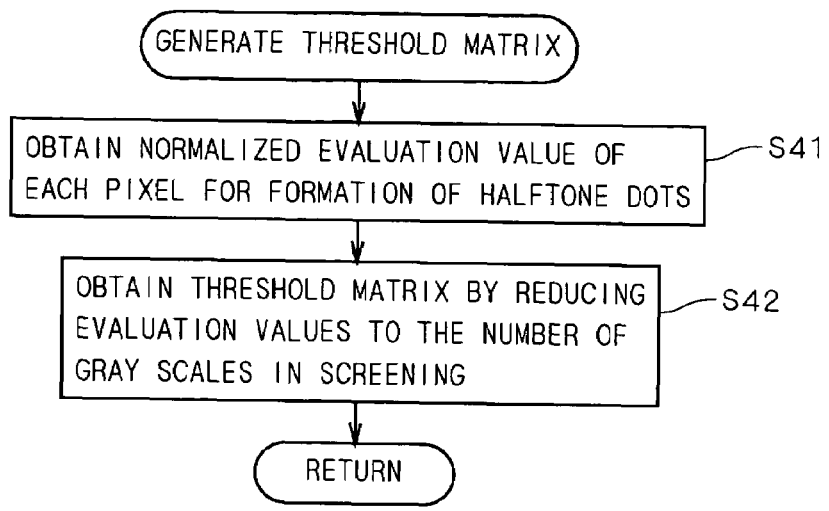
FIG. 11 is a flowchart showing an operation flow for generation of a threshold matrix.

When the setting of the halftone cells is completed, generation of the threshold matrix is performed by the computer 11 (FIG. 4: Step S14). FIG. 11 is a flowchart showing an operation flow for generation of the threshold matrix. In generation of the threshold matrix, first, a first-stage evaluation value is obtained for each of all the pixels in each halftone cell. As the first-stage evaluation value, for example, the distance between the pixel and the cell center of the halftone cell including the pixel or the distance between the pixel and the barycenter of the halftone cell is used. Then, numbers of integer which increase by 1 are sequentially assigned to all the pixels in each halftone cell, from one having the smallest first-stage evaluation value, and the number is divided by the number of pixels constituting the halftone cell, to obtain a second-stage evaluation value (0.0 to 1.0) which is normalized by the size of the halftone cell, which is now assigned. This allows a smaller evaluation value to be assigned to a pixel closer to the cell center (or the barycenter of the halftone cell) (Step S41).

Further, numbers of integer which increase by 1 (the order of pixels on which writing is performed in accordance with increase in gray level of the original image, i.e., the lighting order in exposure) are sequentially assigned to all the pixels in the area 71a, from one having the smallest second-stage evaluation value, and reduction of gray levels is performed in accordance with the number of gray levels in screening (equal to the number of gray levels in the original image in this preferred embodiment) and the final threshold value is thereby assigned to each pixel, to generate the threshold matrix 710 corresponding to the area 71a (see FIG. 1) (Step S42). When the number of pixels in the area 71a is M and the number of gray levels in the original image is N (typically, 256 (=8 bit)), for example, the number (0 to (M−1)) assigned to each pixel is multiplied by ((N−1)/(M−1)) to assign the threshold value ranging from 0 to (N−1) to the pixel.

When generation of the threshold matrix 710 is completed in the computer 11, the threshold matrix 710 and the data of the original image stored in the image memory 104 are transmitted to the image recording apparatus 12 through the communication part 109 and stored in the SPM 23 and the image memory 21 shown in FIG. 2, respectively, as discussed above. With this operation, a threshold group reflecting a dot growth speed in each halftone cell (which corresponds to the amount of variation in area of the dot area in the halftone cell with respect to the amount of variation in gray level of the original image, discussed specifically later) is set in the SPM 23 having the matrix area corresponding to the repeat area 71 where a plurality of halftone cells are arranged (FIG. 4: Step S15).

Then, the gray level of each pixel in the original image stored in the image memory 21 and the corresponding threshold value in the matrix area of the SPM 23 are inputted to the comparator 25, the signal generation circuit 123 in the image recording apparatus 12 generates a signal of halftone dot image and the writing head 122 records the halftone dot on the printing plate 8 (Step S16). Specifically, when the gray level of the pixel in the original image is larger than the threshold value, light is emitted to a position of the printing plate 8 corresponding to the pixel by the recording mechanism 120, to thereby perform writing.

Figure 12A:
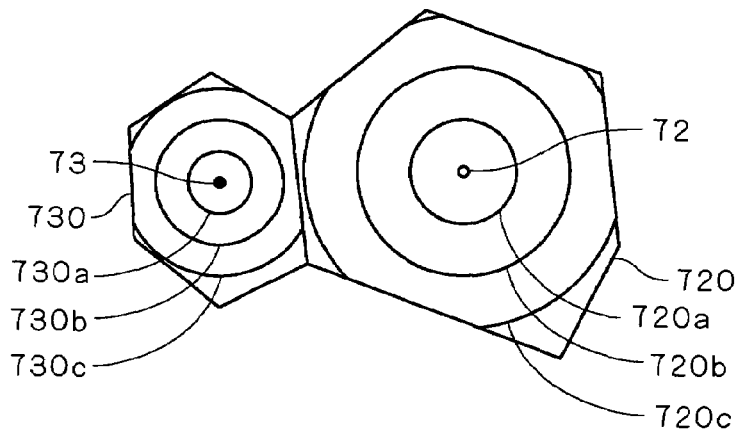
FIGS. 12A to 12C are views showing exemplary changes in size of dot areas.

FIG. 12A is a view illustrating a variation in size of the dot area (a set of pixels to which writing is performed) written in the halftone cell in accordance with variation in gray level of the original image and showing the halftone cell 720 having the cell center 72 of the first group as its center and the halftone cell 730 having the cell center 73 of the second group as its center. Areas 720a to 720c and areas 730a to 730c indicate the dot areas growing in accordance with the increase in gray level of the original image, and when writing is performed on the areas 720a to 720c, writing is performed on the areas 730a to 730c, respectively. In FIG. 12A, since the first-stage evaluation value for each pixel is obtained as a distance from the cell center in Step S41, the areas 720a to 720c and the areas 730a to 730c each have a circular shape.

As discussed above, since the area of the halftone cell 720 in the first group is larger than that of the halftone cell 730 in the second group and the second-stage evaluation value for each halftone cell is normalized, the amount of variation in area of the dot area with respect to the amount of variation in gray level of the original image is always larger in the halftone cell in the first group than that in the second group, as illustrated in FIG. 12A. In this preferred embodiment, the amount of variation in area of the dot area with respect to the amount of variation (amount of increase) in gray level of the original image is referred to as "dot growth speed", and it can be expressed that the dot growth speed of the halftone cell 720 in the first group is higher than that of the halftone cell 730 in the second group.

Figure 12B:
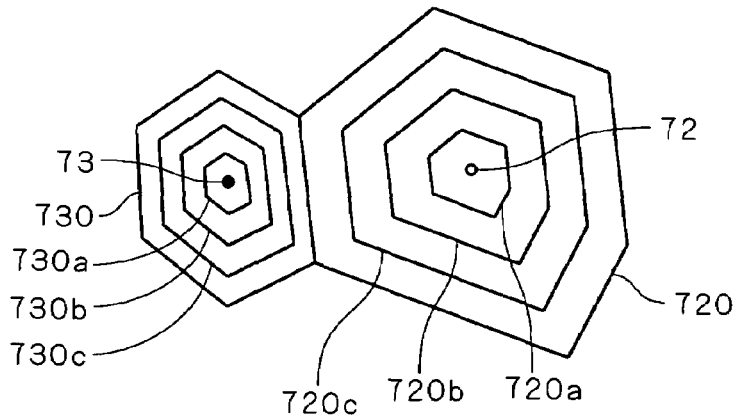
Figure 12C:
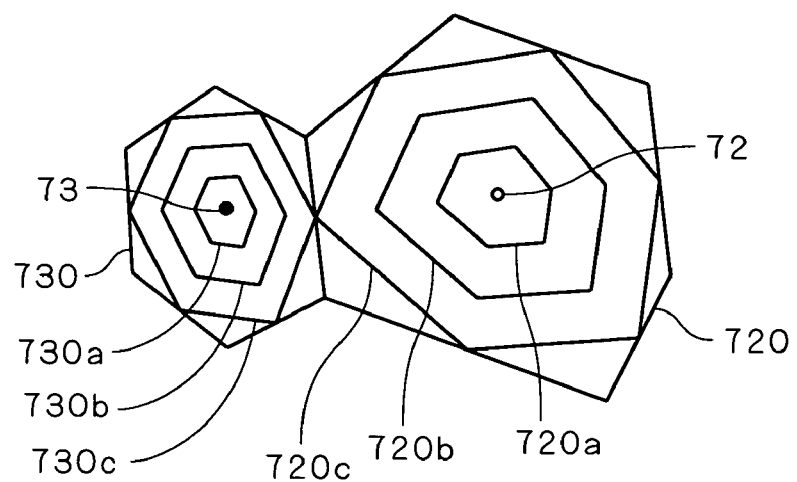

FIGS. 12B and 12C are views showing other examples of growth in the dot area, and constituent elements in these figures identical to FIG. 12A are represented by the same reference signs. In FIG. 12B, as the first-stage evaluation value obtained in Step S41, the ratio between the distance from the cell center to the pixel whose first-stage evaluation value is obtained and the distance from the cell center to an edge of the halftone cell on a line connecting the cell center and the pixel is adopted. In FIG. 12C, an inside polygon connecting midpoints of sides of the halftone cell of polygon is set, and the ratio between the distance from the cell center to the pixel and the distance from the cell center to an edge of the inside polygon on a line connecting the cell center and the pixel is adopted as the first-stage evaluation value. Further, in FIG. 12C, the first-stage evaluation value whose value increases towards vertexes of the halftone cell is set appropriately in an area between the inside polygon and the edge of the halftone cell.

Also in the cases illustrated by FIGS. 12B and 12C, if the original image has the same gray level, the area of the dot area in the halftone cell 720 in the first group is larger than that of the dot area in the halftone cell 730 in the second group, and the dot growth speed in the halftone cell 720 in the first group is higher than that in the halftone cell 730 in the second group.

Figure 13:
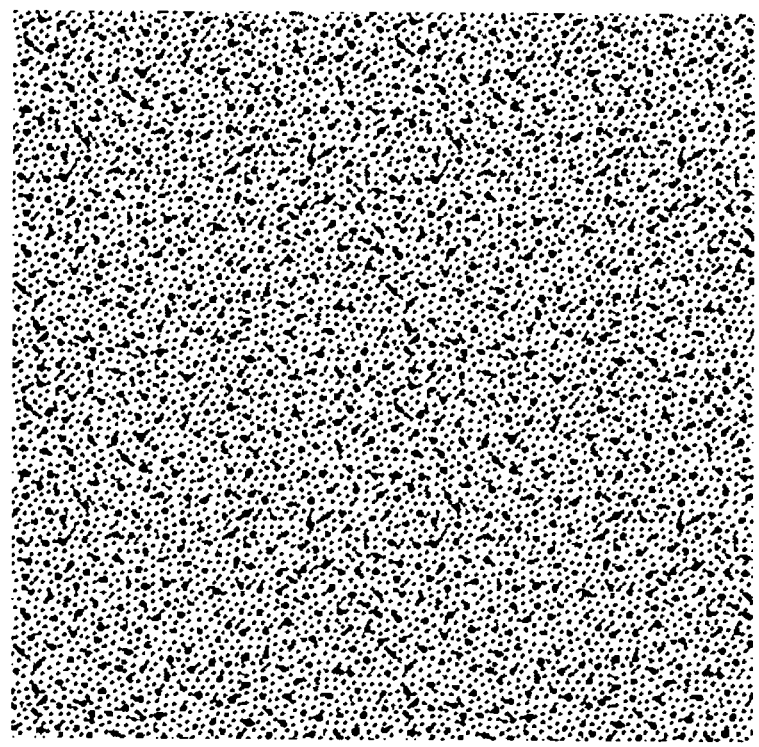
FIG. 13 is a view showing an example of halftone dot image.

FIG. 13 is a view showing an example of halftone dot image formed in the image recording system 1, which is one in a case where the original image is an image having a uniform gray level of 25%. In the halftone dot image shown in FIG. 13, a large dot is written correspondingly to the halftone cell in the first group and a small dot is written correspondingly to the halftone cell in the second group. In accordance with the characteristics of the halftone cell in the first group, the number of large dots is smaller than the number of small dots and the dots are distributed entirely in the halftone dot image uniformly at random.

Figure 14:
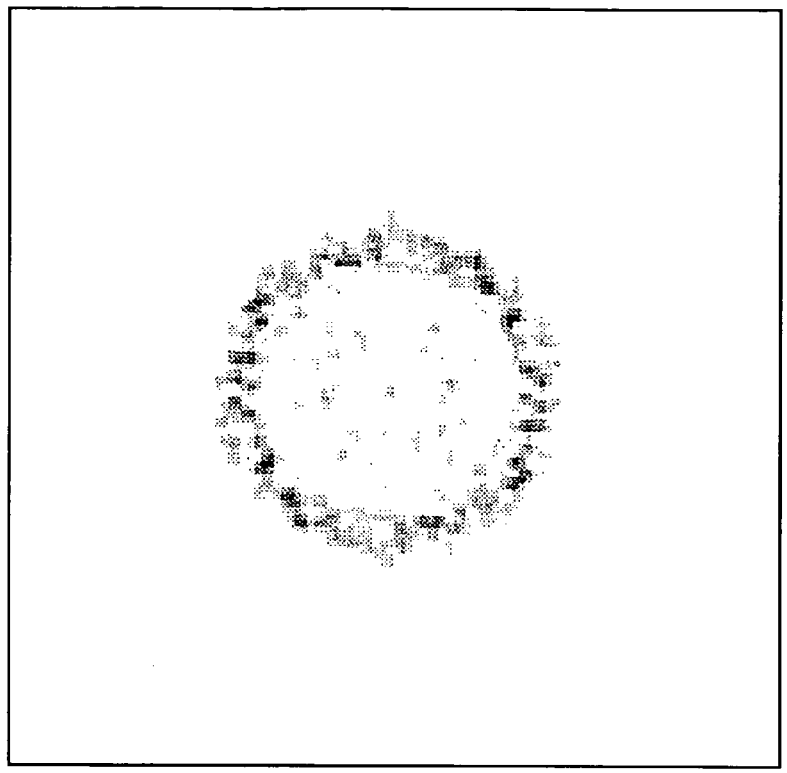
FIG. 14 is a view showing a spatial power spectrum in the halftone dot image.
Figure 15:
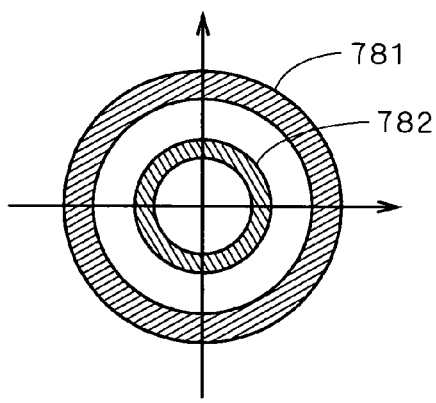
FIG. 15 is a schematic view showing the spatial power spectrum.

FIG. 14 is a view showing a spatial power spectrum in the halftone dot image of FIG. 13, and FIG. 15 is a schematic view showing the spatial power spectrum in the halftone dot image formed by the image recording system 1. Since the halftone cells are arranged at random as discussed above, as shown in FIGS. 14 and 15, the spectrum caused by the halftone cells in the first group and the spectrum caused by the halftone cells in the first and second groups are each distributed in a ring-like frequency band which is almost continuous around an origin, representing a halftone dot image without any moire or beat pattern. In FIG. 15, the radius of an outer ring 781 is the reciprocal of an average distance between the cell centers in the first and second groups (in other words, an average distance between dots in a case where the dots are written near the cell centers) and the radius of an inner ring 782 is the reciprocal of an average distance between the cell centers in the first group. The power in the outer ring 781 is higher than that in the inner ring 782, and the halftone dot image has excellent reproduction in detail with the halftone cells in the first and second groups.

As shown in FIGS. 14 and 15, the outer high-frequency components in the spatial power spectrum are fewer than that in the spectrum (outer ring) caused by the dot areas of all the halftone cells. In other words, in the halftone dot image formed by the image recording system 1, there are few extra-fine halftone dots and it therefore becomes easy to perform writing and printing. Since the inner low-frequency components in the spatial power spectrum are also fewer than that in the spectrum (inner ring) caused by the halftone cells in the first group, it is found that there are few unpleasant patterns in the halftone dot image and the halftone dot image with less graininess can be formed.

From that a plurality of rings appear in the spatial power spectrum, it is found that large and small halftone cells are arranged with good balance, in other words, the halftone cells of different sizes are arranged uniformly at random, and it consequently becomes possible to reduce the banding (noticeable lines in scan direction) as discussed below.

Figure 16A:
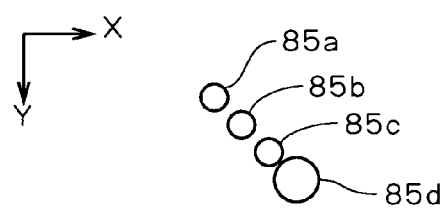
FIG. 16A is a view showing spots of light beams.

FIGS. 16A to 16C are views showing typical examples of banding. FIG. 16A is a view showing arrangement and sizes of spots 85a to 85d of a plurality of light beams from the writing head 122 (see FIG. 1), and in this figure, only the spot 85d is larger (higher in intensity) than the others. FIGS. 16B and 16C are views showing examples of halftone dots in a case where writing is performed by using the spots 85a to 85d, and in these figures, a hatched area represents an area to be originally written and a cross-hatched area represents an area which is excessively written by the spot 85d. As can be seen from comparison between FIGS. 16B and 16C, when the halftone dots are large, unevenness in size of the spots of a plurality of light beams is not visually noticeable but when dots are small, banding due to unevenness in size of the spots becomes noticeable.

Other than the inconsistencies due to trouble in a specific channel shown in FIG. 16C, the banding includes inconsistencies caused by incomplete alignment of swath (band written in the main scan) with respect to the subscan direction and is generally defined as inconsistencies caused in the main scan direction during writing, not due to halftone dot structure. Though the banding becomes noticeable when a fine halftone dot pattern is written, in the spatial power spectrum of the halftone dot image formed by the image recording system 1, since the low-frequency components caused by the halftone cells in the first group are contained, as shown in FIG. 15, the banding can be reduced. Since the area of the halftone cell in the first group is made larger than that of the halftone cell in the second group, it is possible to efficiently reduce an effect of the banding. In the whole halftone dots, as discussed above, since a lot of cell centers are arranged, it is possible to reduce the banding while forming fine halftone dots for monochrome (each color component in color halftone dot image).

In a case where the original image is a color image of gray scale, the image memory 21 stores the original image for each color component and the SPM 23 also stores the threshold matrix for each color component. Then a color component specifying signal 81 is inputted to the image memory 21, the SPM 23 and the channel switching part 120a in the recording mechanism 120 as shown in FIG. 2, and the halftone dot image for each color component (i.e., color plane) is recorded in the halftone dot recording medium in accordance with switching of the color component specifying signal 81.

In this case, different threshold matrixes are prepared for color components, respectively. By changing the positions of the initial points in setting of the cell centers or changing the first-specified cell center belonging to the first group, for example, arrangement of the cell centers of the first and second groups in the threshold matrix is changed by the color component and also the shapes of the halftone cells in the threshold matrix are changed by the color component. By changing the threshold matrix by the color component at random, generation of moire due to multiple printing can be prevented and the structure where the halftone cells are divided into a plurality of groups can be applied to a high-quality color printing using five or more colors.

The channel switching part 120a shifts the writing head 122 for emitting light beams of a plurality of channels in the subscan direction with respect to the printing plate 8 so that different channels can be used for the same coordinates in recording a halftone dot image of one color component and a halftone dot image of other color component. This makes the banding in the color halftone dots more unnoticeable. The above discussion on the case where the original image is a color image can be also applied to other methods of generating the threshold matrix below.

Next, discussion will be made on another example of generation of the threshold matrix by the image recording system 1. Though the basic operation flow for another exemplary generation of the threshold matrix is the same as that shown in Steps S11 to S14 of FIG. 4, this example is different from the case of FIG. 4 in that highlight-side halftone cells in each of which the dot area varies in accordance with the variation in highlight-side gray level in the original image and shadow-side halftone cells in each of which the dot area varies in accordance with the variation in shadow-side gray level are provided.

Figure 17:
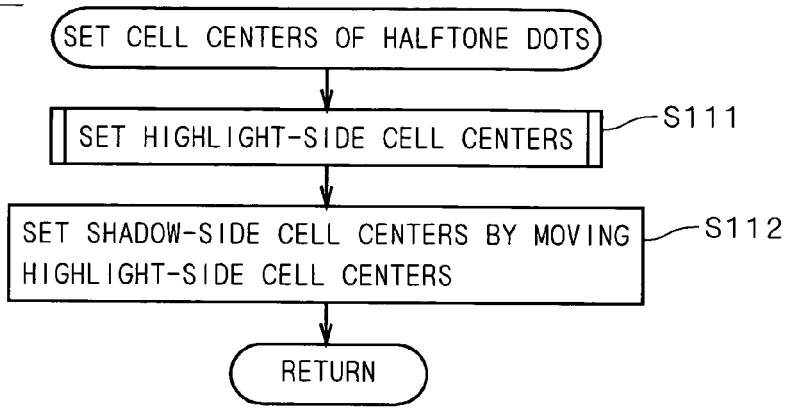
FIG. 17 is a flowchart showing an operation of setting cell centers.
Figure 18:
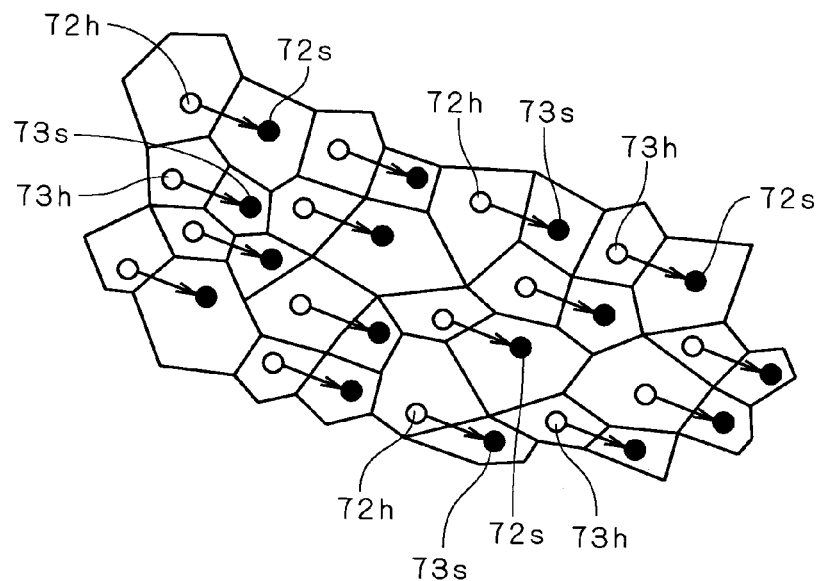
FIG. 18 is a view illustrating arrangement of cell centers and halftone cells in a highlight side and a shadow side.

In setting of halftone cell centers (Step S11), first, as shown in FIG. 17, the highlight-side cell centers are set (Step S111) and then the shadow-side cell centers are set (Step S112). FIG. 18 is a view illustrating arrangement of the highlight-side cell centers and the shadow-side cell centers, and in this figure, the highlight-side cell centers are represented by blank circles and given the reference signs 72h and 73h and the shadow-side cell centers are represented by solid circles and given the reference signs 72s and 73s. FIG. 18 also shows halftone cells. The highlight-side cell centers 72h and 73h are set by repeating movements of points towards the barycenters in the Voronoi polygons, like in FIG. 5. The shadow-side cell centers 72s and 73s are easily determined by shifting the highlight-side cell centers by half the average distance between the cell centers, as indicated by the arrows in FIG. 18.

Figure 19:
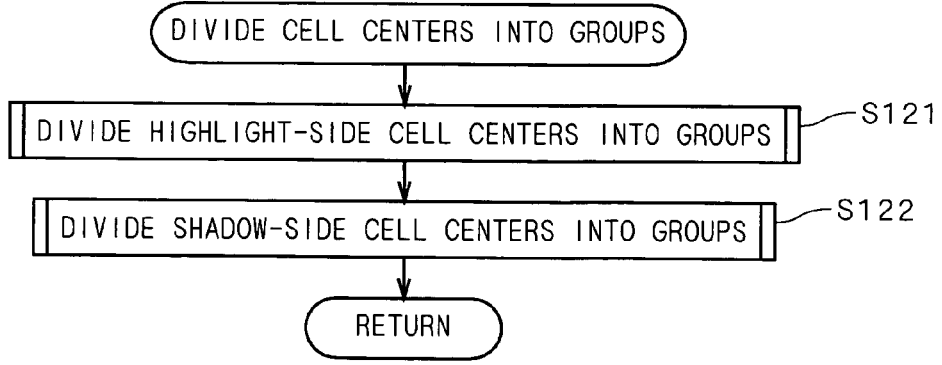
FIG. 19 is a flowchart showing an operation of grouping the cell centers.

Next, grouping of the cell centers (FIG. 4: Step S12) is performed individually for the highlight-side cell centers and the shadow-side cell centers, as shown in FIG. 19 (Steps S121 and S122). The grouping operation for the highlight-side cell centers and the shadow-side cell centers is the same as shown in FIG. 7 and through this operation, some of the highlight-side cell centers which belong to the first group are appropriately dispersed without being adjacent to one another and the some of shadow-side cell centers which belong to the first group are appropriately dispersed without being adjacent to one another. The highlight-side cell centers in the first group and the shadow-side cell centers in the first group are arranged independently of each other.

For both the highlight-side cell centers and the shadow-side cell centers, the number of cell centers in the first group is smaller than the number of cell centers in the second group. In FIG. 18, the highlight-side cell centers in the first and second groups are represented by the reference signs 72h and 73h, respectively, and the shadow-side cell centers in the first and second groups are represented by the reference signs 72s and 73s, respectively.

The above setting of the positions of the cell centers almost uniformly at random substantially corresponds to arrangement of the highlight-side halftone cells and the shadow-side halftone cells which are set in the next step in irregular shapes at random and grouping of a plurality of highlight-side halftone cells and a plurality of shadow-side halftone cells each into two groups each consisting of halftone cells which are distributed almost uniformly.

Subsequent setting of the halftone cells (FIG. 4: Step S13) is performed by the already-discussed method using Eq. 2 without distinction between the highlight side and the shadow side. As a result, as shown in FIG. 18, the halftone cells are set without any clearance so that the areas of the halftone cells having the highlight-side and shadow-side cell centers 72$h$ and 72$s$ in the first group is larger than those of the halftone cells having the cell centers 73$h$ and 73$s$ in the second group.

Figure 20:
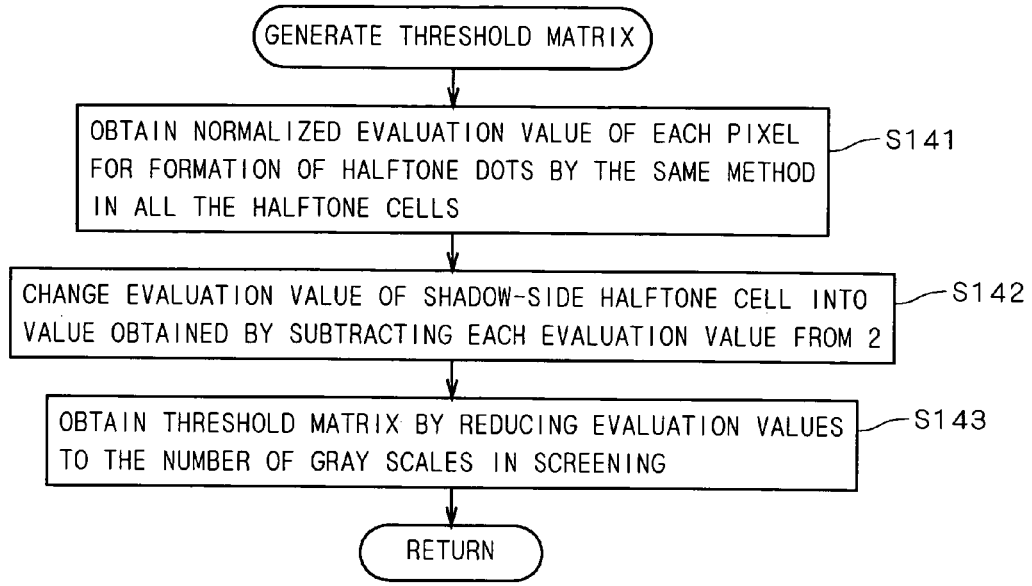
FIG. 20 is a flowchart showing an operation flow for generation of a threshold matrix.

In generation of the threshold matrix (Step S14), as shown in FIG. 20, first, the normalized evaluation value for generation of the halftone dots is obtained for each pixel in all the halftone cells by the same method (Step S141). This operation is the same as that in Step S41 of FIG. 11, and for example, the distance from the cell center to each pixel is obtained as the first-stage evaluation value and then the second-stage normalized evaluation value (ranging from 0.0 to 1.0) which is smaller as the pixel is closer to the cell center is obtained on the basis of the first-stage evaluation value.

Next, for the shadow-side halftone cells, the second-stage evaluation value is changed to a value obtained by subtracting the evaluation value from 2 (Step S142). With this, the pixels in the shadow-side halftone cells are each given the evaluation value ranging from 2.0 to 1.0, and the second-stage evaluation value becomes larger as the pixel is closer to the cell center. After that, numbers of integer which increase by 1 (i.e., the lighting order) are sequentially assigned to all the pixels in the area 71$a$, from one having the smallest second-stage evaluation value, and reduction of gray levels is performed in accordance with the number of gray levels in screening to thereby assign the final threshold value to each pixel, and thus the threshold matrix 710 is generated (see FIG. 1) (Step S143).

The threshold matrix 710 is transmitted to the image recording apparatus 12, and a threshold group reflecting the type of each halftone cell, i.e., whether the highlight side or the shadow side, and a dot growth speed in each halftone cell is set in the SPM 23 having the matrix area corresponding to the area where the highlight-side halftone cells and the shadow-side halftone cells are arranged (FIG. 4: Step S15). Then, the gray level of each pixel in the original image and the corresponding threshold value in the matrix area are compared with each other by the comparator 25, to form the halftone dots (Step S16).

In the threshold matrix obtained in the above operation, threshold values which are half or less than the maximum gray level are given to the positions of the pixels in the highlight-side halftone cells and threshold values which are half or more than the maximum gray level are given to the positions of the pixels in the shadow-side halftone cells. Then, the distribution of the threshold values becomes local minimum at the highlight-side cell centers and the distribution becomes local maximum at the shadow-side cell centers. As a result, when the gray level of the original image increases from 0% to 50%, the dot areas grow from the cell centers in the highlight-side halftone cells and when the gray level increases from 50% to 100%, the dot areas (in this case, the dot area refers to a ring-like writing area) grows from the peripheral portions of the shadow-side halftone cells towards the cell centers (the blank dots are degenerated towards the cell centers). Thus, with the gray level of 50% as a border, the variation of dot areas in the highlight-side halftone cells and the variation of dot areas in the shadow-side halftone cells in response to the variation in gray level are switched, and this allows the variation characteristic of the halftone dots with respect to the variation in gray level of the original image to be almost symmetric on the highlight side and the shadow side and preferable halftone dots can be thereby formed.

Since the areas of the halftone cells in the first group is set larger than that of the halftone cells in the second group both on the highlight side and the shadow side and the first-stage evaluation values are normalized in each halftone cell, the dot growth speed(s) of the halftone cells in the first group is higher than that of the halftone cells in the second group both on the highlight side and the shadow side. As a result, the spatial power spectrum in the halftone dot image is such as shown in FIG. 15, and since the high-frequency components outside the outer ring 781 are few and there are few extra-fine halftone dots, it becomes easy to perform writing and printing. Further, since the low-frequency components inside the inner ring 782 are also few and there are few unpleasant patterns in the halftone dot image, the halftone dot image with less graininess can be formed. One of the two frequency bands which has the highest power corresponds to the average distance between the writing dots in the highlight-side halftone cells during formation of the halftone dots and the average distance between the blank dots in the shadow-side halftone cells.

Since a plurality of rings appear in the spatial power spectrum and the large and small halftone cells are arranged with good balance at random, the banding can be reduced with the low-frequency components caused by the halftone cells in the first group.

Though the halftone cells (or the highlight-side and shadow-side halftone cells) are divided into the first group and the second group in the above discussion, the halftone cells may be divided into three or more groups. When the halftone cells are divided into the first to third groups, for example, in the process of FIG. 7, Steps S33 to S35 are repeated at predetermined times, to determine the cell centers belonging to the first group, and then Steps S33 to S35 are further repeated to determine the cell centers belonging to the second group and finally, the remaining cell centers are determined as ones belonging to the third group.

In this case, the number of cell centers in the first group is smaller than both the number of cell centers in the second group and that in the third group, and the coefficient $\alpha$ used in the computation of Eq. 2 in Step S13 of FIG. 4 is made smaller than 1 when the cell center belongs to the first group and made 1 or smaller than 1 but larger than that in the first group when the cell center belongs to the second group or the third group ($\alpha$ is determined for each group). With this, the halftone cells in the first group which is the smallest group are dispersed without being adjacent to one another and have larger areas and a higher dot growth speed(s) as compared with the halftone cells in the other groups.

The spatial power spectrum of the halftone dot image formed by the above operation is spread in a plurality of frequency bands each having an almost continuous ring shape around an origin in accordance with the periodicity and isotropy of arrangement of the halftone cells in the first to third groups. In other words, the spectrum has an almost isotropic property, and the power of the spectrum is small in the low-frequency and high-frequency areas and there are local peaks of power between these frequency areas. One of the frequency bands which has the highest power corresponds to the average distance between the cell centers, i.e., the average distance between dots in formation of the halftone dots. This allows the halftone dot image to have excellent reproduction in detail. The spectrum has a ring shape when there are a lot of halftone cells arranged in the area (or the matrix area) corresponding to the repeat area, but when there are not a lot of halftone cells, the spectrum has an intermittent ring shape and lower isotropic property.

Even if the halftone cells are divided into a plurality of groups, a halftone dot image can be formed with few high-frequency components outside the outermost ring and few low-frequency components inside the innermost ring in the spatial power spectrum of the halftone dot image, few fine halftone dots resulting in easy recording, and few unpleasant patterns and less graininess. With the low-frequency components caused by the halftone cells in the first group having large areas and a higher dot growth speed(s) (a low-frequency fluctuation effect), it is possible to appropriately reduce the banding caused by a trouble in a specific recording channel or the like.

When the number of cell centers in the second group is smaller than the number of cell centers in the third group, it is preferable that the coefficient α used in the computation of Eq. 2 on the cell centers of the second group should be smaller than that in the computation on the cell centers of the third group. This allows the halftone cells in the second group to be larger than those in the third group and achieves reduction of banding with the low-frequency components caused by the halftone cells in the second group.

Though the preferred embodiment of the present invention has been discussed above, the present invention is not limited to the above-discussed preferred embodiment, but allows various variations.

For example, the image recording apparatus 12 may be an electrophotographic printing apparatus which records halftone dots on a photosensitive drum while scanning multichannel light beams with respect to the photosensitive drum and prints the halftone dots on printing paper, or an ink-jet printing apparatus which records halftone dots on printing paper while scanning multichannel ink-jet nozzles with respect to the printing paper. In these cases, the photosensitive drum or the printing paper serves as a halftone dot recording medium.

Figure 21:
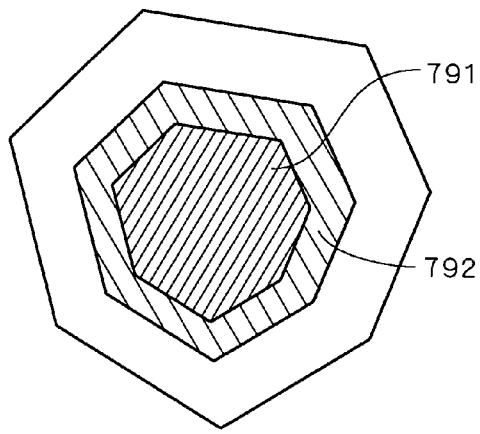
FIG. 21 is a view illustrating multitone halftone dots.

Some printing apparatus record a halftone dot image of multitone dots other than binary dots, and the technique for forming halftone dots of halftone cells which are divided into a plurality of groups having different dot growth speeds can be applied to the printing apparatus. In this case, a plurality of threshold matrixes are prepared, and the gray level of each pixel in an original image is compared with a plurality of threshold values from a plurality of threshold matrixes, to determine which density is used for writing. This allows a multiple halftone dot having a center dot area 791 with high density and a peripheral dot area 792 with low density in the halftone cell illustrated in FIG. 21 to be written and the areas 791 and 792 and the other area have densities of 1, 0.5 and 0, respectively. The dot growth speed in the multitone halftone dot is regarded as, for example, the amount of variation in (density×area) with respect to the amount of variation in gray level of the original image.

Also in the case where the image recording apparatus 12 is an electrophotographic printing apparatus using multichannel light beams or an ink-jet printing apparatus having multichannel ink-jet nozzles, when an original image is a color image, by using different channels (i.e., different laser optical sources or different ink-jet nozzles) for the same coordinates in recording halftone dots of one color component and halftone dots of other color component, as discussed above, it is possible to further reduce the banding in a color halftone dot image.

Figure 22A:
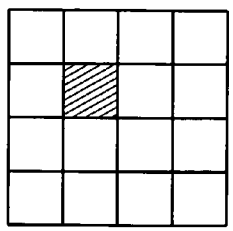

In the image recording apparatus 12, as illustrated in FIG. 22A, when the recording stability is low in a case where writing is performed on only one pixel and not performed on the other pixels around this pixel, it is preferable that a plurality of threshold values near a cell center in a threshold matrix should be so corrected as to be equal values so that the minimum dot size (minimum cluster size) should be 2×2 pixels (or 1×2 pixels), as shown in FIG. 22B.

The image recording apparatus 12 does not necessarily perform multichannel recording but may perform recording of halftone dots with one modulated light beam or one nozzle. Even in this case, it is possible to reduce fluctuation of the apparatus occurring for each scanning in recording the halftone dots, which appears as banding, by dividing halftone cells into groups having different dot growth speeds.

Out of the groups of the halftone cells (or highlight-side and shadow-side halftone cells), the area of each of the halftone cells in the group consisting of a minimum number of halftone cells is set larger than that in any other group, to make the dot growth speeds different among the groups in the above-discussed preferred embodiment, but even if the areas of the halftone cells are not significantly different among the groups, by making the dot growth speeds different among the groups (the dot growth speed in the minimum group is not necessarily higher than that in any other group), it is possible to produce an effect of reducing the banding by a function of low-frequency components.

While the invention has been shown and described in detail, the foregoing description is in all aspects illustrative and not restrictive. It is therefore understood that numerous modifications and variations can be devised without departing from the scope of the invention.

What is claimed is:

1. A halftone dot formation method for forming halftone dots used to represent an original image of gray scale, comprising the steps of:
   a) arranging a plurality of halftone cells in irregular shapes at random and dividing said plurality of halftone cells into a plurality of groups each consisting of halftone cells which are distributed uniformly; and
   b) forming halftone dots on the basis of an original image with said plurality of groups having different dot growth speeds each of which corresponds to the amount of variation of a dot area in a halftone cell with respect to the amount of variation in gray level of said original image, wherein
   halftone cells belonging to one of said plurality of groups which consists of a minimum number of halftone cells are so arranged as not to be adjacent to one another, each having a larger area and a higher dot growth speed as compared with halftone cells belonging to other groups.

2. The halftone dot formation method according to claim 1, wherein said step b) comprises the steps of:
   b1) setting a threshold group reflecting a dot growth speed for each halftone cell in a matrix area corresponding to an area in which said plurality of halftone cells are arranged; and
   b2) comparing a gray level of each pixel in said original image with a corresponding threshold value in said matrix area to form halftone dots.

3. A halftone dot formation method for forming halftone dots used to represent an original image of gray scale, comprising the steps of:
   a) arranging a plurality of highlight-side halftone cells each having a dot area which varies in accordance with variation in highlight-side gray level and a plurality of shadow-side halftone cells each having a dot area which varies in accordance with variation in shadow-side gray level in irregular shapes at random and dividing said plurality of highlight-side halftone cells into a plurality of groups each consisting of halftone cells which are distributed uniformly and said plurality of shadow-side halftone cells into a plurality of groups each consisting of halftone cells which are distributed uniformly; and b) forming halftone dots on the basis of an original image with said plurality of groups having different dot growth speeds each of which corresponds to the amount of variation of a dot area in a halftone cell with respect to the amount of variation in gray level of said original image both in said plurality of highlight-side halftone cells and said plurality of shadow-side halftone cells.

4. The halftone dot formation method according to claim 3, wherein said step b) comprises the steps of:

b1) setting a threshold group reflecting the type of each halftone cell, whether the highlight side or the shadow side, and a dot growth speed for each halftone cell in a matrix area corresponding to an area in which said plurality of highlight-side halftone cells and said plurality of shadow-side halftone cells are arranged; and b2) comparing a gray level of each pixel in said original image with a corresponding threshold value in said matrix area to form halftone dots.

5. The halftone dot formation method according to claim 3, wherein with the gray level of 50% in the original image as a border, variation of a dot area in each of said plurality of highlight-side halftone cells and variation of a dot area in each of said plurality of shadow-side halftone cells in response to variation in gray level are switched.

6. The halftone dot formation method according to claim 3, wherein halftone cells belonging to one of said plurality of groups which consists of a minimum number of halftone cells are so arranged as not to be adjacent to one another, each having a larger area and a higher dot growth speed as compared with halftone cells belonging to other groups both in said plurality of highlight-side halftone cells and said plurality of shadow-side halftone cells.

7. A halftone dot formation apparatus for forming halftone dots used to represent an original image of gray scale, comprising:

a memory having a matrix area corresponding to an area in which a plurality of halftone cells are arranged;

a calculation part for obtaining a threshold group which is set for said matrix area; and a comparator for comparing a gray level of each pixel in an original image with a corresponding threshold value in said matrix area to generate a halftone signal, wherein said calculation part executes the steps of:

a) arranging a plurality of halftone cells in irregular shapes at random and dividing said plurality of halftone cells into a plurality of groups each consisting of halftone cells which are distributed uniformly; and b) obtaining a threshold group to make said plurality of groups have different dot growth speeds each of which corresponds to the amount of variation of a dot area in a halftone cell with respect to the amount of variation in gray level of said original image, wherein halftone cells belonging to one of said plurality of groups which consists of a minimum number of halftone cells are so arranged as not to be adjacent to one another, each having a larger area and a higher dot growth speed as compared with halftone cells belonging to other groups.

8. The halftone dot formation apparatus according to claim 7, further comprising a recording mechanism for recording halftone dots in a halftone dot recording medium on the basis of a halftone signal from said comparator while scanning a light source for emitting multichannel light beams or multichannel ink-jet nozzles with respect to said halftone dot recording medium.

9. A halftone dot formation apparatus for forming halftone dots used to represent an original image of gray scale, comprising:

a memory having a matrix area corresponding to an area in which a plurality of halftone cells are arranged;

a calculation part for obtaining a threshold group which is set for said matrix area; and a comparator for comparing a gray level of each pixel in an original image with a corresponding threshold value in said matrix area to generate a halftone signal, wherein said calculation part executes the steps of:

a) arranging a plurality of highlight-side halftone cells each having a dot area which varies in accordance with variation in highlight-side gray level and a plurality of shadow-side halftone cells each having a dot area which varies in accordance with variation in shadow-side gray level in irregular shapes at random and dividing said plurality of highlight-side halftone cells into a plurality of groups each consisting of halftone cells which are distributed uniformly and said plurality of shadow-side halftone cells into a plurality of groups each consisting of halftone cells which are distributed uniformly; and b) obtaining a threshold group to make said plurality of groups have different dot growth speeds each of which corresponds to the amount of variation of a dot area in a halftone cell with respect to the amount of variation in gray level of said original image both in said plurality of highlight-side halftone cells and said plurality of shadow-side halftone cells.

10. The halftone dot formation apparatus according to claim 9, wherein halftone cells belonging to one of said plurality of groups which consists of a minimum number of halftone cells are so arranged as not to be adjacent to one another, each having a larger area and a higher dot growth speed as compared with halftone cells belonging to other groups both in said plurality of highlight-side halftone cells and said plurality of shadow-side halftone cells.

11. The halftone dot formation apparatus according to claim 9, further comprising a recording mechanism for recording halftone dots in a halftone dot recording medium on the basis of a halftone signal from said comparator while scanning a light source for emitting multichannel light beams or multichannel ink-jet nozzles with respect to said halftone dot recording medium.

12. A method of generating a threshold matrix which is compared with an original image of gray scale in forming halftone dots used to represent said original image, comprising the steps of:

a) arranging a plurality of halftone cells in irregular shapes at random and dividing said plurality of halftone cells into a plurality of groups each consisting of halftone cells which are distributed uniformly; and b) setting a threshold group in a matrix area corresponding to an area in which said plurality of halftone cells are arranged so that said plurality of groups have different dot growth speeds each of which corresponds to the amount of variation of a dot area in a halftone cell with respect to the amount of variation in gray level of said original image, wherein halftone cells belonging to one of said plurality of groups which consists of a minimum number of halftone cells are so arranged as not to be adjacent to one another, each having a larger area and a higher dot growth speed as compared with halftone cells belonging to other groups.

13. A method of generating a threshold matrix which is compared with an original image of gray scale in forming halftone dots used to represent said original image, comprising the steps of:

a) arranging a plurality of highlight-side halftone cells each having a dot area which varies in accordance with variation in highlight-side gray level and a plurality of shadow-side halftone cells each having a dot area which varies in accordance with variation in shadow-side gray level in irregular shapes at random and dividing said plurality of highlight-side halftone cells into a plurality of groups each consisting of halftone cells which are distributed uniformly and said plurality of shadow-side halftone cells into a plurality of groups each consisting of halftone cells which are distributed uniformly; and b) setting a threshold group in a matrix area corresponding to an area in which said plurality of highlight-side halftone cells and said plurality of shadow-side halftone cells are arranged so that said plurality of groups have different dot growth speeds each of which corresponds to the amount of variation of a dot area in a halftone cell with respect to the amount of variation in gray level of said original image both in said plurality of highlight-side halftone cells and said plurality of shadow-side halftone cells.

14. The method of generating a threshold matrix according to claim 13, wherein with the gray level of 50% in the original image as a border, variation of a dot area in each of said plurality of highlight-side halftone cells and variation of a dot area in each of said plurality of shadow-side halftone cells in response to variation in gray level are switched in said step b).

15. The method of generating a threshold matrix according to claim 13, wherein halftone cells belonging to one of said plurality of groups which consists of a minimum number of halftone cells are so arranged as not to be adjacent to one another, each having a larger area and a higher dot growth speed as compared with halftone cells belonging to other groups both in said plurality of highlight-side halftone cells and said plurality of shadow-side halftone cells.

* * * * *